United States Patent [19]

Belmont

[11] Patent Number: 5,535,400

[45] Date of Patent: Jul. 9, 1996

[54] SCSI DISK DRIVE POWER DOWN APPARATUS

[75] Inventor: Brian V. Belmont, Houston, Tex.

[73] Assignee: Compaq Computer Corporation, Houston, Tex.

[21] Appl. No.: 188,400

[22] Filed: Jan. 28, 1994

[51] Int. Cl.⁶ .................................................. G06F 13/00
[52] U.S. Cl. ............................................. 395/750; 369/32
[58] Field of Search ............................... 395/750; 369/32

[56] References Cited

U.S. PATENT DOCUMENTS

| | | | |
|---|---|---|---|
| 4,802,152 | 1/1989 | Markvoort et al. | 369/32 |
| 5,167,024 | 11/1992 | Smith et al. | 395/375 |
| 5,181,201 | 1/1993 | Schauss et al. | 370/85.1 |
| 5,339,426 | 8/1994 | Aoshima | 395/700 |
| 5,355,453 | 10/1994 | Row et al. | 395/200 |
| 5,361,364 | 11/1994 | Nagashige et al. | 395/750 |

Primary Examiner—Jack B. Harvey
Assistant Examiner—John Travis
Attorney, Agent, or Firm—Pravel, Hewitt, Kimball & Krieger

[57] ABSTRACT

An SCSI controller having a mechanism for receiving a power down request indicating that the SCSI disk drives should be spun down. Preferably, the SCSI controller has an input for receiving a power down request signal. The SCSI controller monitors activity on the SCSI bus and asserts a signal indicative thereof to power management logic. The power management logic monitors the resources of the computer system and generates a system interrupt and the power down signal to initiate a power down mode when the computer system is determined to be idle. The CPU receives the system interrupt to perform traditional power down sequences. The SCSI controller receives the power down signal and generates a SCSI interrupt. The CPU also receives the SCSI interrupt and executes an SCSI device driver. The SCSI device driver determines that power down mode is being initiated, and sends spin down request commands to the SCSI controller for each SCSI drive. The SCSI controller powers down each of the SCSI devices in response. Any subsequent activity requiring access to any SCSI drive is detected by interrupt calls to the SCSI device driver, which then sends spin up requests to the SCSI controller, if necessary.

5 Claims, 5 Drawing Sheets

SCSI DISK DRIVE POWER DOWN APPARATUS

BACKGROUND OF THE INVENTION

1. Field of the Invention

The present invention relates to an apparatus for powering down SCSI disk drives, and more particularly, to a SCSI controller receiving a power down request and providing an interrupt to the SCSI device driver to initiate power down of the SCSI disk drives.

2. Desciption of the Related Art

Most of the smaller computers, including portable, laptop and notebook computers, have the option of being powered by a rechargeable battery. Since a battery has a finite and limited amount of energy, these smaller computers almost invariably include a power down mode to conserve energy. In typical power down schemes, the system BIOS provides complete control over most of the system assets, including the monitor or display, disk drives including floppy and Integrated Drive Electronics (IDE) hard disk drives, the input/output (I/O) devices, the system clock and sometimes even a portion of the power supply itself.

Hard and floppy disk drives are an integral part of a power down management scheme, since the electrical motors and some of the drive circuitry consume a significant amount of energy. The system BIOS usually has complete control over IDE-type disk drives, so that when a power down mode is initiated during periods of inactivity, the motors and part of the power drive circuitry are shut off as controlled by the system BIOS. This is often referred to as spinning down the disk drives.

In order to meet the Energy Star ratings issued by the Environmental Protection Agency, it is considered desirable to apply power down techniques to all levels of professional or personal computer systems, including desktop PCs and server systems. Many of the larger PC systems, particularly the higher end workstation and server systems, require a significant amount of permanent data storage. This data storage need is often achieved with a separate array of small computer system interface (SCSI) disk drives. Up to seven SCSI disk drives may be coupled to a single SCSI bus and controlled by a SCSI controller. An array of SCSI disk drives may also include multiple SCSI buses, where each bus includes multiple SCSI disk drives. The SCSI disk drives consume a considerable amount of power during operation, so that each should be placed in a spun down state to achieve an effective power down scheme. However, SCSI disk drive systems are usually completely independent of the system BIOS, where the system BIOS has no understanding of or control over the SCSI system including the SCSI device driver, controller and bus. Therefore, traditional power down schemes controlled by the system BIOS are simply inadequate to achieve a comprehensive power-down scheme for a computer system including SCSI disk drives.

It is desirable therefore to implement a comprehensive power-down management scheme for a computer system including SCSI disk drives, with the capability to spin down the SCSI disk drives during periods of system inactivity.

SUMMARY OF THE PRESENT INVENTION

A computer system implemented according to the present invention includes a SCSI controller that receives a power down request indicating that the SCSI disk drives should be spun down. In the preferred embodiment, a power management controller monitors the computer system resources and asserts a power down signal to the SCSI controller during periods of system inactivity. In response to the power down signal, the SCSI controller sets a bit in an SCSI interrupt status register and generates a SCSI interrupt to the central processing unit (CPU). The CPU executes a SCSI device driver routine in response to the SCSI interrupt, where the SCSI device driver reads the SCSI interrupt status register and determines whether a power down request has been indicated. If so, the device driver sends a spin down command to the SCSI controller for each of the SCSI disk drives.

In the preferred embodiment, only the disk drives, the monitor and the CPU are affected when the power down mode is entered, although more comprehensive power down schemes are also contemplated. In particular, the motors of the floppy and hard disk drives are turned off, the monitor is turned off and the CPU is slowed down by changing the clock speed. When any system activity is detected, the system is returned to its normal state. Thus, power consumption and the noise level of the system is substantially reduced during the power down mode.

The power management controller preferably monitors many system activities and devices, including several interrupt requests, the communication ports, IDE hard and floppy drives, printer ports, the game port, I/O requests and the SCSI bus. Monitoring of any of these events or devices may be disabled by the user. The power management controller preferably includes an inactivity counter, and reloads the inactivity counter with a predetermined count value upon the occurrence of any of the enabled activities. The count value is preferably determined by the user and represents a period of time of inactivity before power down is initiated. The SCSI controller preferably provides a signal to the power management controller indicating whether the SCSI bus is active. Thus, if the user indicates that the SCSI bus is to be monitored as a power management event, power down is indicated upon timeout of the inactivity counter when all monitored events and devices, including the SCSI bus, are idle.

To initiate the power down mode, the power management controller asserts the power down signal to the SCSI controller, and also asserts a system management interrupt (SMI) to the CPU. An SMI interrupt routine executed by the CPU determines that the power down management mode has been initiated, and performs a power down sequence through the system BIOS. The SMI interrupt routine handles the monitor, the floppy and IDE hard disk drives and the CPU slow down through system BIOS in a similar manner as known to those skilled in the art.

The power down signal implemented according to the present invention is provided to allow spinning down the SCSI disk drives. Upon detecting the power down signal, the SCSI controller sets a bit in a SCSI interrupt status register and generates a SCSI interrupt. The CPU, upon receiving the SCSI interrupt, executes an SCSI device driver to determine the cause of the SCSI interrupt. If a power down request was received, the SCSI device driver queues up a spin down request command for each SCSI disk drive in internal buffers, and also determines whether there are any outstanding requests to any of the SCSI disk drives. The spin down request commands are queued last since all other tasks have the highest priority. Once all other disk requests are handled, and if the power down signal is still asserted as indicated by the SCSI status buffer, the SCSI device driver executes a spin down request command to the SCSI controller for each SCSI disk drive attached to the SCSI bus. Once the SCSI disk drives are spun down, the SCSI device driver issues a spin up request upon receiving any calls requiring access to any one of the SCSI disk drives.

In this manner, a power down scheme according to the present invention provides complete control of the primary system resources including the SCSI disk drives during periods of system inactivity. The present invention allows the SCSI disk drives to be spun down, or inactivated, in spite of their complete independence from the system BIOS code. Therefore, greater energy savings are achieved to better enable compliance with the Energy Star program.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

Figure 1:
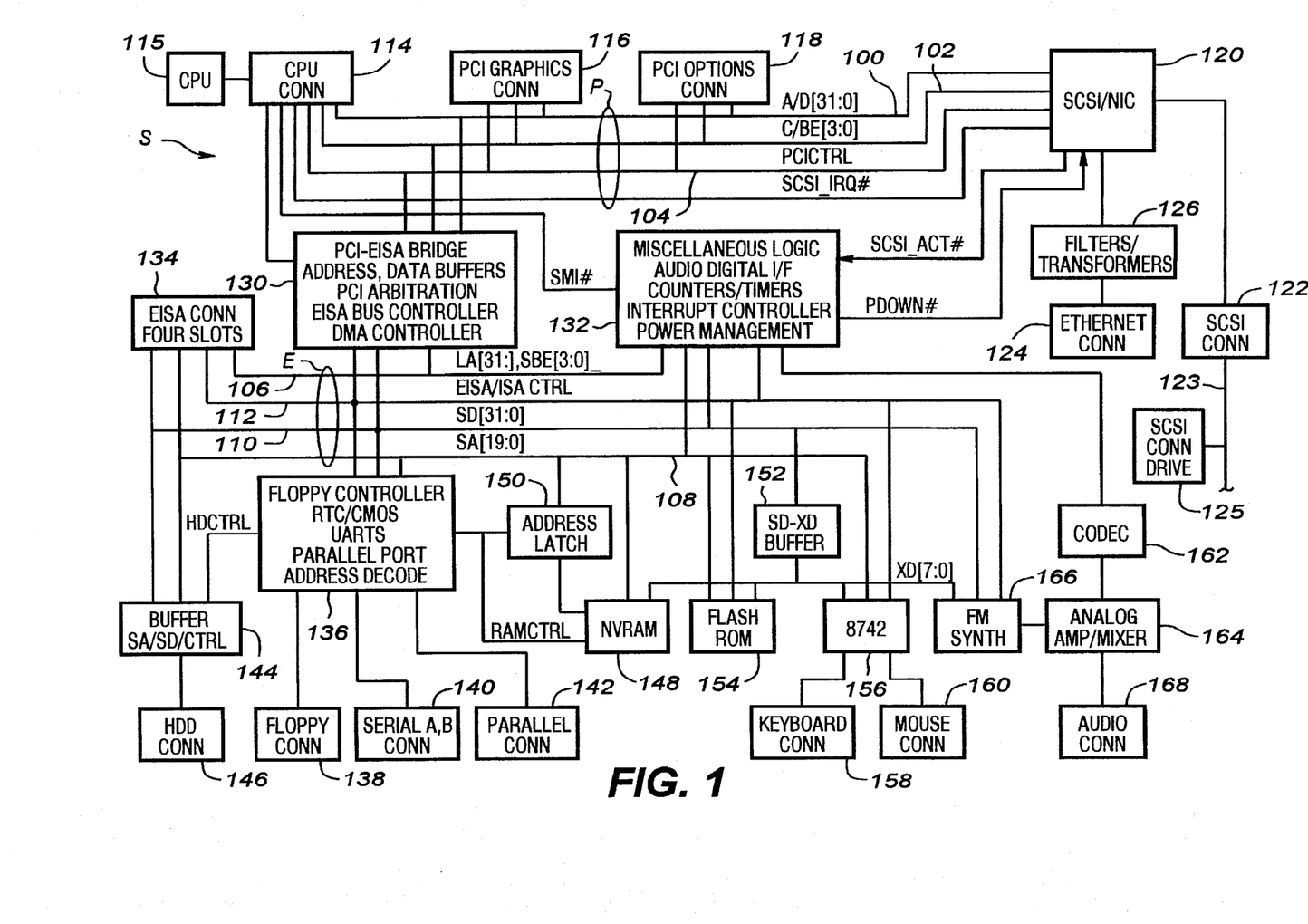
FIG. 1 is a simplified block diagram of a computer system including the SCSI disk drive power down apparatus according to the present invention.

Referring now to FIG. 1, the system board S of a computer system according to the present invention is shown. In the preferred embodiment, the system board S contains circuitry and slots for receiving interchangeable circuit boards. In the preferred embodiment, there are two primary buses located on the system board S. The first bus is the PCI or Peripheral Component Interconnect bus P which includes address/data portion 100, control and byte enable portion 102 and control signal portion 104. The second primary bus on the system board S is the EISA bus E. The EISA bus E includes LA address portion 106, SA address portion 108, SD data portion 110 and EISA/ISA control signal portion 112. The PCI and EISA buses P and E form the backbones of the system board S.

Figure 2A:
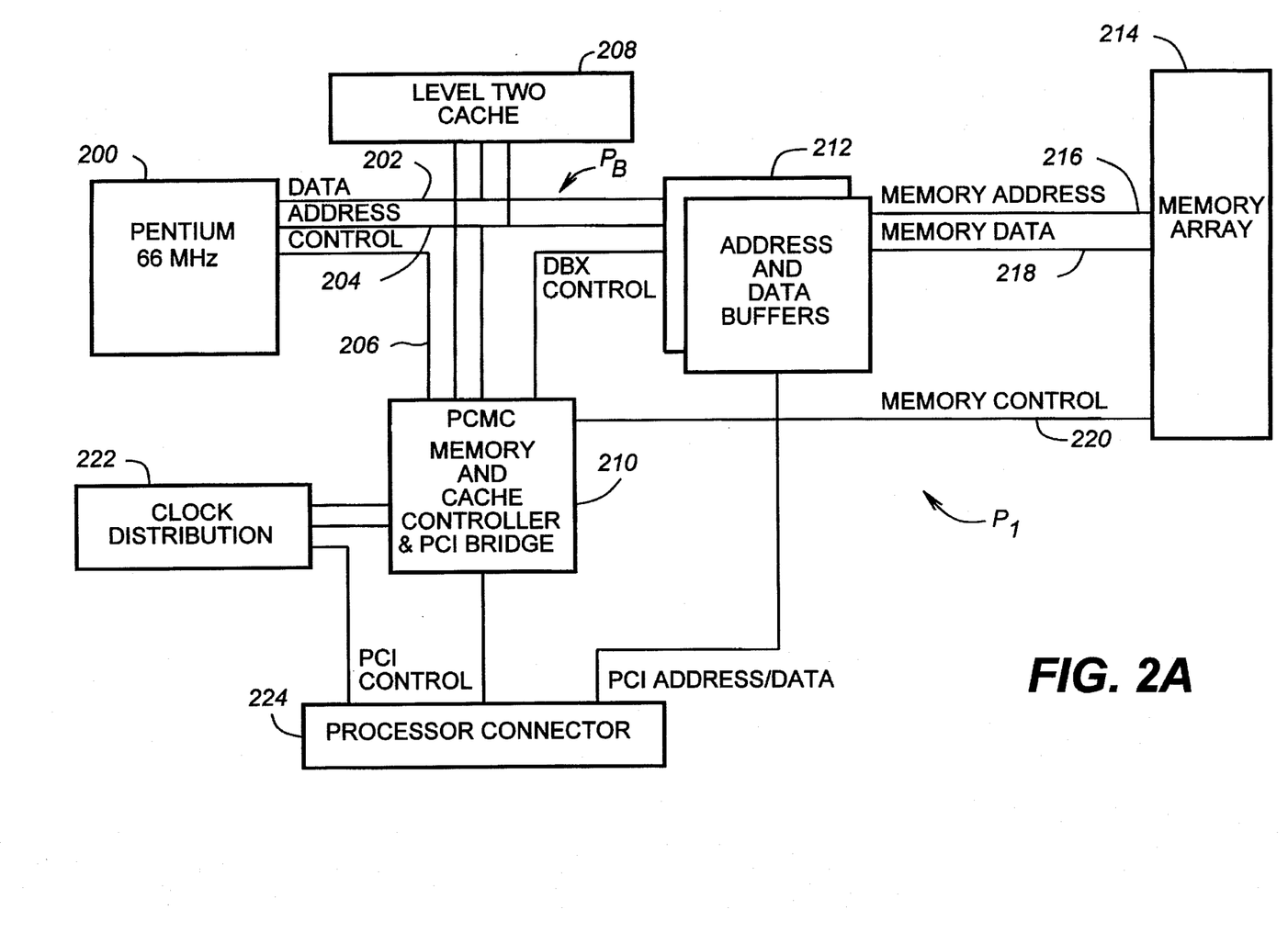
FIGS. 2A and 2B illustrate alternate processor boards which could be used for the CPU of FIG. 1.
Figure 2B:
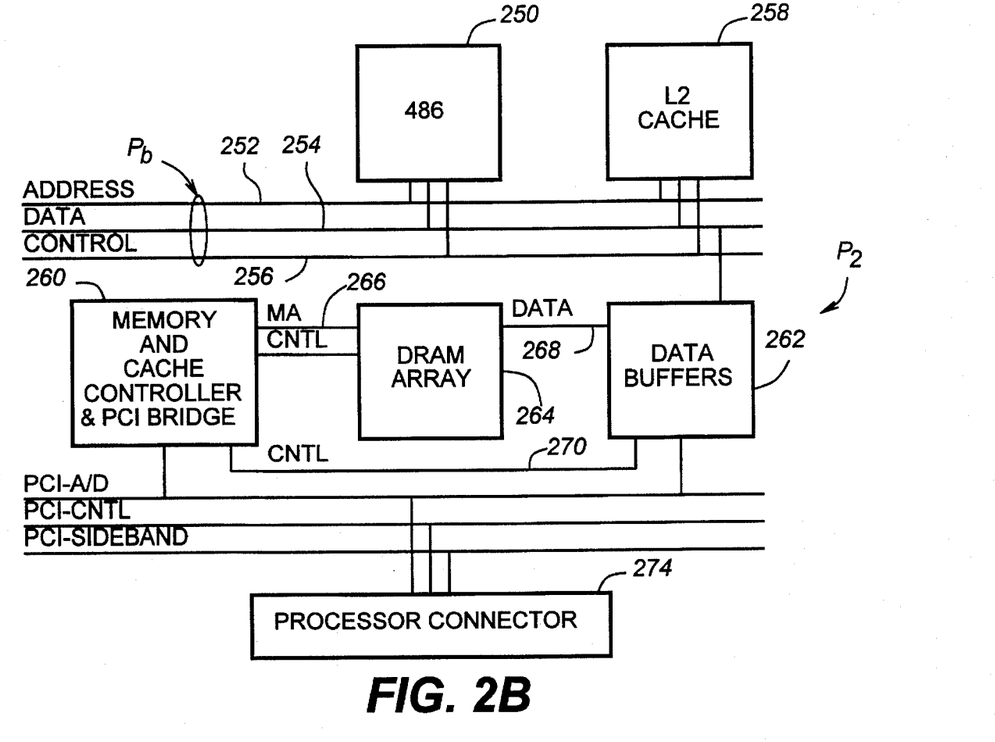
Figure 2C:
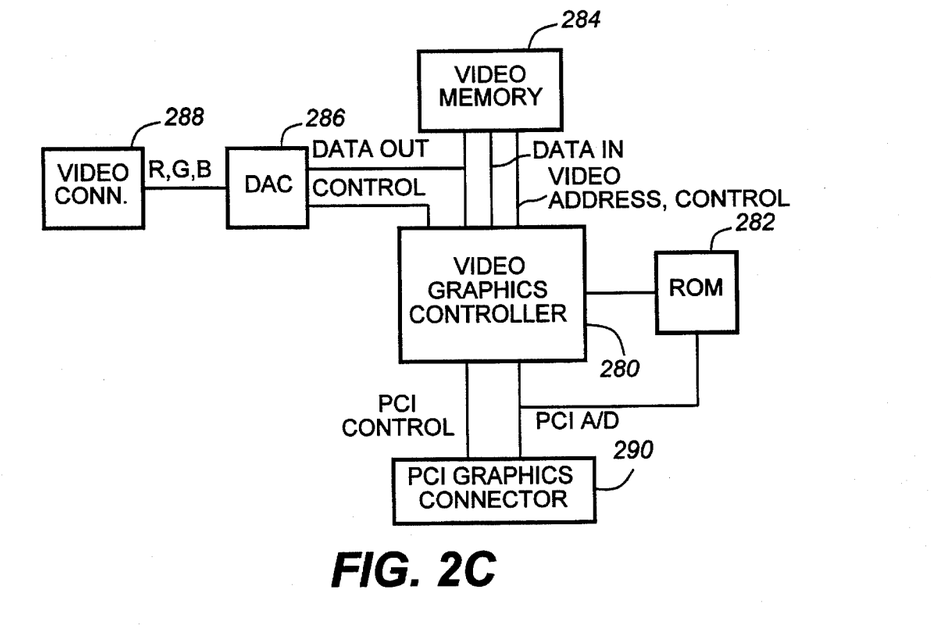
FIG. 2C is a simplified block diagram of a video controller for use with the system of FIG. 1.

A CPU connector 114 is connected to the PCI bus P to receive a CPU 115, which is preferably in the form of an interchangeable processor card. Examples of preferred interchangeable processor cards are shown in FIGS. 2A and 2B. A PCI graphics connector 116 is connected to the PCI bus P to receive a video graphics card as shown in FIG. 2C. A PCI option connector 118 is also connected to the PCI bus P to receive any additional cards designed according to the PCI standard. In addition, a SCSI and network interface (NIC) controller 120 is connected to the PCI bus P. Preferably the SCSI/NIC controller 120 is a single integrated circuit and includes the capabilities necessary to act as a PCI bus master and slave and the circuitry to act as a SCSI controller and an Ethernet interface.

A SCSI connector 122 is connected to the SCSI/NIC controller 120 to allow connection of a SCSI bus 123. Various SCSI devices, such as SCSI hard disk drives, tape drives and CD-ROM drives, are connected to the SCSI bus 123 for interfacing with the system board S. For simplicity, only one SCSI disk drive 125 is shown, it being understood that more SCSI devices could be connected as known to those skilled in the art. The SCSI disk drive 125 generally represents any SCSI disk drive coupled to the SCSI bus 123. An Ethernet connector 124 is provided on the system board S and is connected to filter and transformer circuitry 126, which in turn is connected to the SCSI/NIC controller 120. This forms a network or Ethernet connection for connecting the system boards and computer to a local area network (LAN).

A PCI-EISA bridge 130 is provided to convert signals between the PCI bus P and the EISA bus E. The PCI-EISA bridge 130 includes the necessary address and data buffers and latches, arbitration and bus master control logic for the PCI bus, EISA arbitration circuitry, an EISA bus controller as conventionally used in EISA systems and a DMA controller. Preferably, the PCI-EISA bridge 130 is a single integrated circuit, but other combinations are possible. A power management and miscellaneous system logic chip 132 is connected to the EISA bus E. The power management and miscellaneous system logic chip 132 contains a digital audio interface, counters and timers as conventionally present in personal computer systems, an interrupt controller for both the PCI and EISA buses P and E and power management logic, as well as other miscellaneous circuitry. For purposes of the present disclosure and for simplicity, it will be referred to as the power management logic 132, even though it performs several other important functions.

A series of four EISA slots 134 are connected to the EISA bus E to receive ISA and EISA adapter cards. A combination I/O chip 136 is connected to the EISA bus E. The combination I/O chip 136 preferably includes a floppy disk controller, real time clock (RTC)/CMOS memory, two UARTs, a parallel port and various address decode logic. A floppy disk connector 138 for receiving a cable to a floppy disk drive is connected to the combination I/O chip 136. A pair of serial port connectors are also connected to the combination I/O chip 136, as is a parallel port connector 142. A buffer 144 is connected to both the EISA bus E and the combination I/O chip 136 to act as a buffer between the EISA bus E and a hard disk drive connector 146 to allow connection of an IDE-type hard disk drive.

A non-volatile random access memory (NVRAM) 148 is connected to the EISA bus E and receives its control signals from the combination I/O chip 136. An address latch 150 is connected to the EISA bus E and controlled by the combination I/O chip 136 to provide additional addressing capability for the NVRAM 148. Preferably the NVRAM 148 is used to contain certain system information. A data buffer 152 is connected to the SD portion of the EISA bus E to provide an additional data bus XD for various additional components of the computer system. The NVRAM 148 is connected to the XD data bus to receive its data bits. A flash ROM 154 receives its control and address signals from the EISA bus E and is connected to the XD bus for data transfer. Preferably, the flash ROM 154 contains the system BIOS information for the computer system and can be reprogrammed to allow for revisions of the BIOS. An 8742 or keyboard controller 156 is connected to the XD data bus and EISA address and control portions 108 and 112. The keyboard controller 156 is of conventional design and is connected in turn to a keyboard connector 158 and a mouse or pointing device connector 160.

The computer system of the preferred embodiment also includes audio capabilities. To this end a CODEC chip 162 is connected to the power management logic 132 and to an analog amplifier and mixer chip 164. An FM synthesizer chip 166 is connected to the analog amplifier and mixer 164 and receives digital information from the XD data bus. The FM synthesizer 166 is also connected to the control and data portions 110 and 112 of the EISA bus E and is controlled by the power management logic 132. An audio connector 168 is provided to allow external audio connections to the computer and is connected to the outputs and inputs of the analog amplifier and mixer 164.

Referring now to FIGS. 2A and 2B, alternate processor board designs are shown to implement the CPU 115. In the processor board P1 of FIG. 2A, the processor 200 is the Pentium processor from Intel, preferably operating at 66 MHz. The processor 200 provides data, address and control portions 202, 204 and 206 to form a processor bus PB. A level two (L2) or external cache memory system 208 is connected to the processor bus PB to provide additional caching capabilities to improve performance of the computer system. A processor cache and memory controller (PCMC) and PCI bridge chip 210, such as the 82434LX chip from Intel Corporation is connected to the control portion 206 and to the address portion 204. The PCMC 210 is connected to the L2 cache 208 as it incorporates the cache controller and therefore controls the operations of the cache memory devices in the L2 cache 208. The PCMC 210 is also connected to control a series of address and data buffers 212.

The address and data buffers 212 are preferably the 82433LX from Intel and are utilized to handle memory addressing and memory data to a main memory array 214. The address and data buffers 212 are connected to the processor data portion 202 and processor address portion 204 and receive control signals from the PCMC 210. The address and data buffers 212 provide a memory address bus 216 and a memory data bus 218 to the memory array 214. A memory control signal bus 220 is provided from the PCMC 210. Clock distribution and generation circuitry 222 is associated with the processor card P1 and is connected to the PCMC 210. A processor connector 224, such as a card edge, is provided to be mateably received by the processor connector 114. The processor connector 224 is connected to the PCMC 210, the address and data buffers 212 and the clock distribution circuitry 222 to provide clocks to the computer system and to provide a PCI interface to allow the processor 200 to access the PCI and EISA buses P and E and to allow PCI and EISA bus masters to access the main memory array 214.

Referring now to FIG. 2B, an alternate processor card P2 is shown. In the processor card P2, the processor 250 is preferably a 486 class processor, such as the 486 S-class processors. Again, address, data and control portions 252, 254 and 256 are developed from the processor 250 to form a processor bus PB. An L2 cache memory 258 is connected to the processor bus PB, while a cache and memory controller and PCI bridge chip (CDC) 210, such as the 82424TX from Intel, is also connected to the processor bus PB. The CDC 210 controls the operations of the L2 cache 258, as similarly performed in processor card P1 by the PCMC 210. A main memory array 264 receives its address information directly from the CDC 260, as well as its control signals. Data buffers 262, preferably the 82423TX from Intel, are connected between the processor data portion 254 and a data bus 268 to the memory array 264. The data buffers 262 are controlled by the CDC 260. Again, a processor connector 274 is provided to be mateably received with the processor connector 114. The CDC 260 is connected to the processor connector 274, as are the data buffers 262.

Referring now to FIG. 2C, an exemplary video graphics adapter is shown. A video graphics controller 280 is connected to a PCI graphics connector 290, which is mateably received in the PCI graphics connector 116. A ROM 282 is connected to the graphics connector 290 and receives control signals from the video graphics controller 280. Video memory 284 is used to store the graphics data and is connected to the video graphics controller 280 and a digital/analog converter (DAC) 286. The video graphics controller 280 controls the operation of the video memory 284, allowing data to be written and retrieved as required. A video connector 288 is connected to the DAC 286. A monitor (not shown) is connected to the video connector 288.

It is noted that the above description of a computer system is provided for completeness and numerous variations could be developed as apparent to those skilled in the art.

Referring back to FIG. 1, the power management logic 132 monitors several system activities and devices to determine when to enter a power down mode. Preferably, the system activities include the occurrence of all or selected ones of the hardware interrupts IRQ0–IRQ15, and any I/O reads or writes to several selected ports, including the communication ports (ports 3F8$h$, 2F8$h$, 3E8$h$ or 2E8$h$), the ports for the IDE-type hard drives (ports 1F0-1F7$h$ or 3F6-3F7$h$) and the floppy drive (ports 3F0-3F5$h$ or 3F7$h$), the printer ports LPT1 (378-37F$h$), LPT2 (278-27F$h$) or LPT3 (3BC-3BF$h$), the game port (201$h$), and a programmable I/O address range. The address port definitions in parenthesis are followed by a small "h" to denote hexadecimal notation. The power management logic 132 also monitors any activity on the SCSI bus 123 by receiving a signal SCSI_ACT# from the SCSI/NIC controller 120, which asserts the SCSI_ACT# signal low when there is any activity on the SCSI bus 123. A pound sign "#" following a signal name indicates that the signal conforms to negative logic, where that signal is considered asserted when at a logic low level and negated when at a logic high level. Thus, the SCSI/NIC controller 120 is responsible for monitoring activity on the SCSI bus 123.

The SCSI/NIC controller 120 essentially serves as a transfer device between the CPU 115 executing the SCSI device driver and the SCSI devices on the SCSI bus 123. In particular, a command or data packet is transferred between the SCSI device driver and a SCSI disk drive for each transaction. The SCSI bus 123 includes a SCSI busy signal, which is asserted during each transaction. The SCSI/NIC controller 120 preferably monitors the SCSI busy signal and sets a SCSI busy bit while the SCSI busy signal is asserted, where the SCSI busy bit is modified at least once every microsecond to obtain a granularity of one microsecond. The SCSI_ACT# is an inverted and buffered version of the SCSI busy bit.

Preferably, a user setup program is included so that the user of the computer system can configure the power management capabilities by defining which system activities and events are monitored, as well as an idle time duration associated with each event. The power management logic 132 preferably includes several inactivity counters, which are preloaded with a time-out value specified by the user. The inactivity counters continually count down during normal operation. The power management logic 132 re-loads the inactivity counters with the time-out value if any of the monitored and enabled activity or events are detected. Each inactivity counter is based on different events, such as all monitored activities, monitored hard drive and SCSI activities and monitored video controller activity. Thus, when the SCSI_ACT# signal is asserted low, the power management logic 132 re-loads its inactivity counters associated with any system event and the hard drive activities with the timeout values. In this manner, the inactivity counters will not time out as long as any of the SCSI disk drives are active. However, if the entire system is idle, including the SCSI disk drives as indicated by the SCSI_ACT# signal being negated high, the inactivity counters eventually time out, initiating the power down mode.

When any of the inactivity counters time out, the power management logic 132 asserts a signal SMI# low, which causes an interrupt to the CPU 115. The SMI# signal is preferably connected to the CPU 115 through the CPU connector 114 as shown. Upon receipt of the SMI# interrupt signal, the CPU 115 executes an SMI handler routine, which first determines the cause of the interrupt. For example, the SMI# interrupt signal may be asserted by hardware or through software or upon several other conditions. The SMI handler reads a plurality of SMI registers, including an SMI status register in the power management logic 132, to determine the cause of the SMI interrupt. If the full power down mode is indicated by the SMI status register as all inactivity counters have timed out, the CPU 115, as controlled by the SMI handler, initiates part of the power down mode. In particular, the CPU 115 turns off the monitor, spins down the IDE-type hard disk drives and slows down the clock of the CPU 115 in the preferred embodiment, if they have not been turned off or slowed down previously. All of these activities are controlled by the CPU 115 through the system BIOS. However, the system BIOS is independent of the SCSI/NIC controller 120 and the SCSI bus 123, so that a separate means is required to spin down the SCSI disk drives 125.

The power management logic 132 preferably asserts a signal PDOWN# low to initiate power down of the hard disk drives, which is received by an interrupt handler circuit (not shown) residing within the SCSI/NIC controller 120. The PDOWN# signal is effectively provided by the inactivity counter associated with the hard drives and is also effectively a source of the SMI# signal. When the CPU 115 receives the SMI# signal based on the PDOWN# signal, it will read the SMI status register and spin down any IDE disk drives. The interrupt handler circuit in the SCSI/NIC controller 120 is preferably similar to the front end or interrupt receiving portions of known programmable interrupt controllers available on the market today, such as the 8259 interrupt controller by Intel. The interrupt handler circuit allows masking of any interrupt requests, reading the pending status of any interrupt requests, and provides an output interrupt strobe upon receiving a new interrupt request. As the interrupt handler circuit in the SCSI/NIC controller 120 also buffers the PDOWN# signal into a SCSI interrupt status register, the status of the PDOWN# signal may be monitored by reading the SCSI interrupt status register. The interrupt handler circuitry of the SCSI/NIC controller 120 asserts a SCSI interrupt signal, referred to as SCSI_IRQ#, which is provided to the CPU 115, either directly or through the CPU connector 114. Therefore, upon the falling edge of the PDOWN# signal indicating initiation of the disk drive power down mode, the SCSI/NIC controller 120 asserts the SCSI interrupt signal to the CPU 115 to spin down the SCSI disk drives. Alternatively, if pin count of the SCSI/NIC controller 120 is of utmost concern, the power management logic 132 could function as a bus master on the PCI bus P and execute an I/O write cycle to a dedicated register within the SCSI/NIC controller 120. If an I/O write cycle is performed instead, it performs essentially the same function, so that the PDOWN# signal would not be necessary.

Figure 3A:
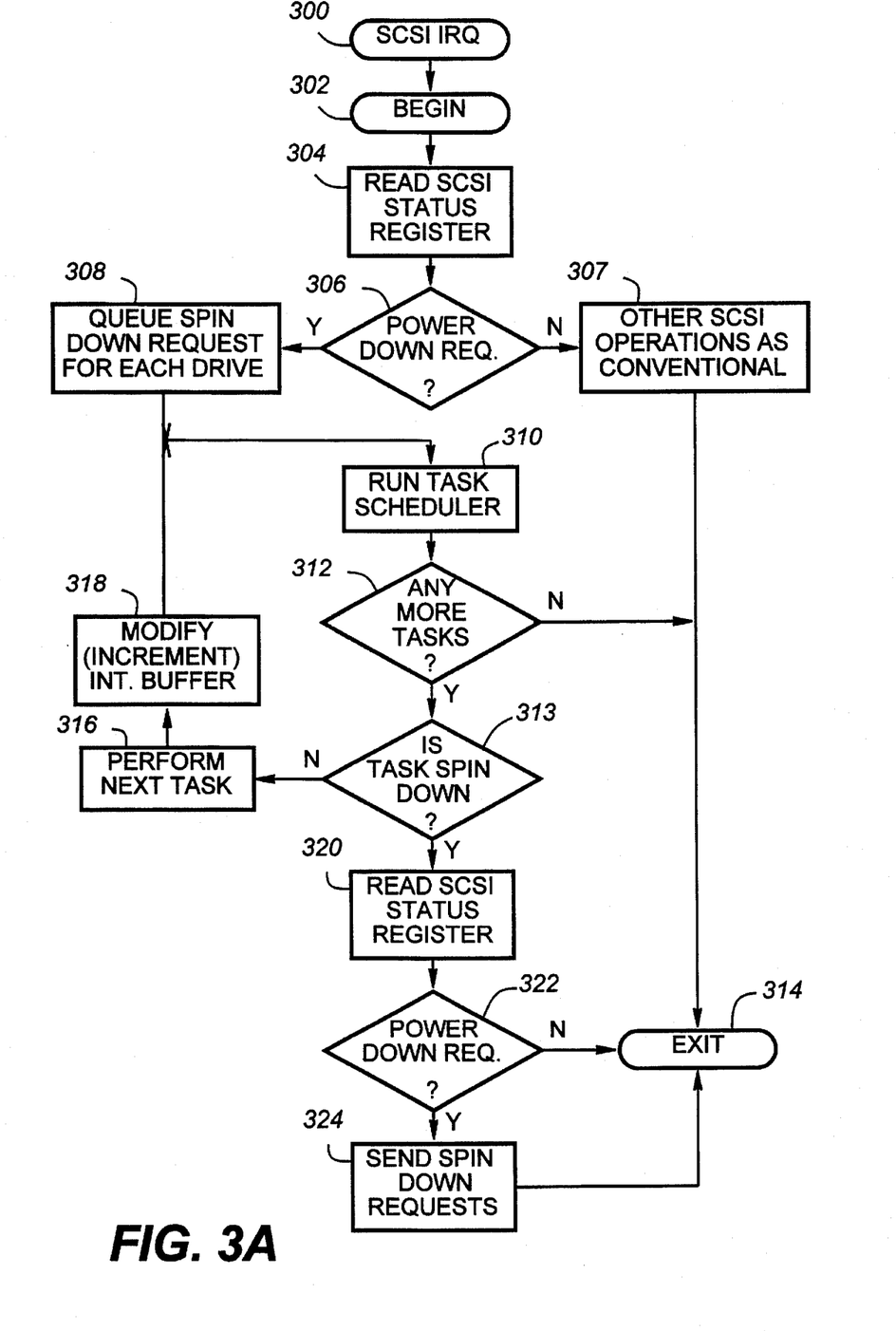
FIG. 3A is a flowchart diagram illustrating operation of a SCSI device driver according to the present invention executed in response to a hardware interrupt.
Figure 3B:
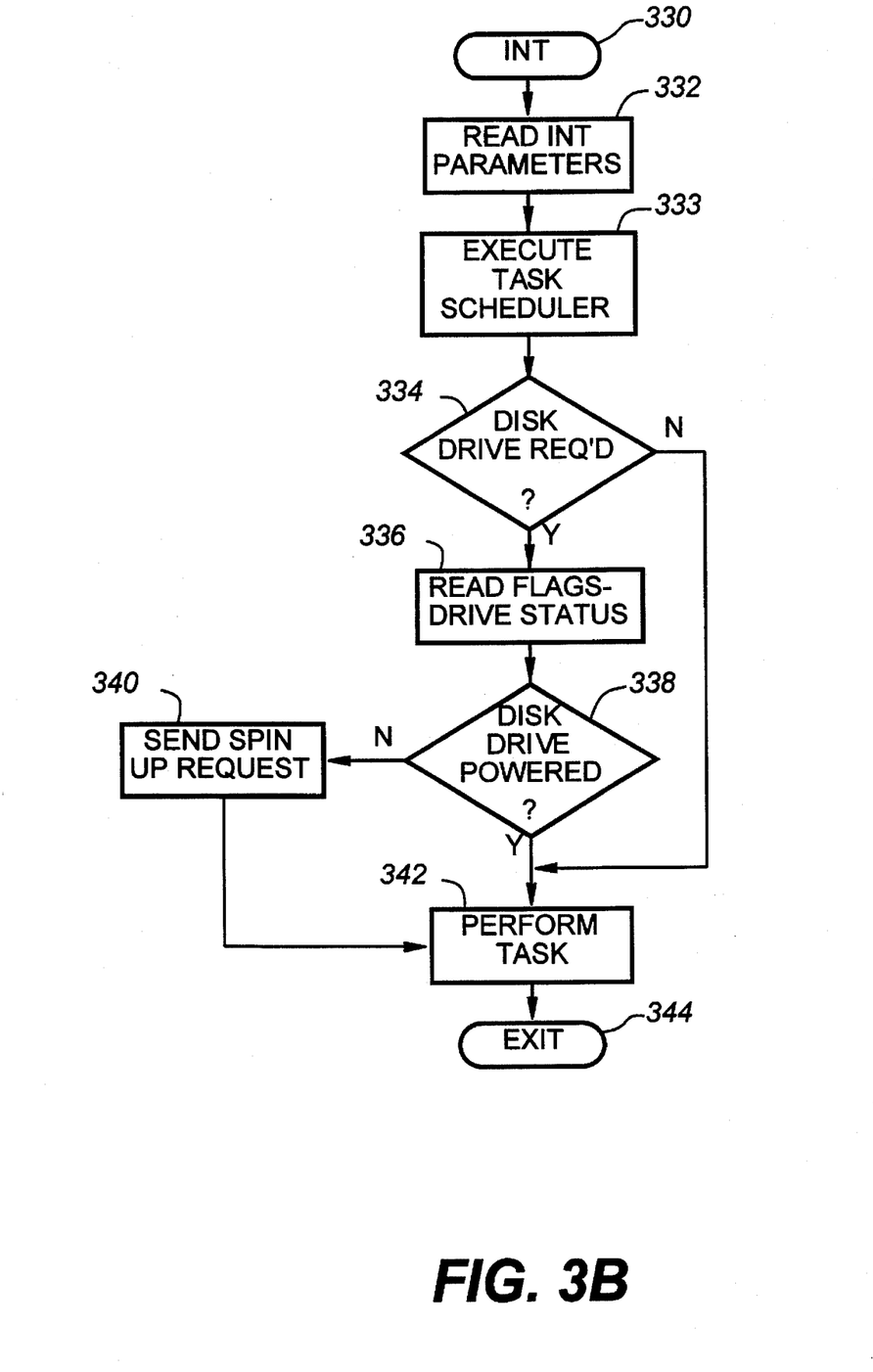
FIG. 3B is a flowchart diagram illustrating operation of the SCSI device driver executed in response to a task call or software interrupt.

FIGS. 3A and 3B are flowchart diagrams illustrating the operation of a SCSI device driver according to the present invention. The CPU 115 detects the assertion of the SCSI_IRQ# signal and then executes the SCSI device driver to determine the cause of the SCSI interrupt. It is noted that the SCSI interrupt is possibly generated in response to several events, including normal activity of any of the SCSI disk drives or other devices coupled to the SCSI bus 123. For example, when the SCSI disk drive 125 completes a task initiated by the SCSI device driver, it asserts the SCSI_IRQ# signal, or instructs the SCSI/NIC controller 120 to do so, to indicate completion of the task. Therefore, the SCSI device driver must first determine the cause of a SCSI interrupt.

Referring now to FIG. 3A, a first step 300 indicates that a SCSI interrupt has occurred by the assertion of the SCSI_IRQ# signal low. The CPU 115 then loads and executes the SCSI device driver as indicated by a begin step 302. Operation proceeds to a step 304, where the SCSI device driver performs an operation on the PCI bus P to read the SCSI interrupt status register located within the SCSI/NIC controller 120. Recall that one of the bits within the SCSI interrupt status register indicates the assertion of the PDOWN# signal indicating that power down operations should be initiated. Operation proceeds to a step 306 from step 304, where it is queried whether the SCSI interrupt status register indicates the power down mode. If the power down mode is not indicated by the power down bit within the SCSI interrupt status register, operation proceeds to a step 307 from step 306, where any commands other than spin down request commands are performed as conventional based on the various other bits in the interrupt status register. From step 307, operation proceeds and terminates at an exit step 314. Those operations are conventional of SCSI operations and are not detailed here for clarity and brevity.

If the power down mode is indicated by the power down bit in step 306, operation proceeds to a step 308, where a spin down request command is queued up into local or internal command buffers controlled by the SCSI device driver for each SCSI disk drive. Preferably, a separate internal command buffer is provided for each SCSI disk drive coupled to the SCSI bus 123. Thus, a separate spin down request command is queued into each internal command buffer. It is noted that the internal command buffers may, at this time, only include the spin down request commands. However, if other tasks for a SCSI disk drive on the SCSI bus 123 are scheduled to occur, they are also queued in the internal command buffers and must be executed before the spin down request command. The SCSI device driver determines whether there are currently any outstanding tasks to be performed associated with any SCSI devices, where these tasks receive higher priority than the spin down request commands.

Operation proceeds to a step 310 from step 308, where the SCSI device driver executes a task scheduler, which reviews the internal command buffers and executes the next command in the queue for each SCSI disk drive. Operation proceeds to a step 312, where it is queried whether there are any more tasks to be performed. If not, operation proceeds to step 314, where the SCSI device driver is exited and operation proceeds as normal. If any more tasks are to be completed as determined in step 312, operation proceeds to a step 313, where it is queried whether the next task is a spin down request command as queued up in step 308. If the task is anything other than a spin down request command, operation proceeds to a step 316 where the next task is performed. Operation then proceeds to a step 318 from step 316, where each internal command buffer is modified to point to the next task to be completed per SCSI disk drive. From step 318, operation loops back to step 310, where the task scheduler is once again reviewed to determine the next task to be performed. In this manner, operation loops between steps 310, 312, 313, 316 and 318 if there are a plurality of tasks queued up in the task scheduler until all of the queued tasks are completed for all SCSI disk drives.

If the task is a spin down request command as determined in step 313, operation proceeds to a step 320, where the SCSI device driver once again performs a read operation to retrieve the contents of the SCSI interrupt status register in the SCSI/NIC controller 120. From step 320, operation proceeds to a step 322, where it is queried whether the power down request is still indicated within the SCSI interrupt status register. If so, operation proceeds to a step 324, where the SCSI device driver issues the spin down request command across the PCI bus P to the SCSI/NIC controller 120 for each SCSI disk drive coupled to the SCSI bus 123. The SCSI/NIC controller 120 correspondingly sends each spin down request command to the appropriate SCSI disk drive, which responds by turning off its motors. Thus, all disk drives coupled to the SCSI bus 123 are powered down. Alteratively, the SCSI device driver may send a single universal spin down request command to the SCSI/NIC controller 120, which responds by sequentially or concurrently powering down all SCSI disk drives connected to the SCSI bus 123. From step 324, operation exits through step 314.

If a power down request was received causing the SCSI interrupt, but a subsequent event required access to any of the SCSI disk drives, the SCSI/NIC controller 120 asserts the SCSI_ACT# signal low while the SCSI device driver is executing. In response, the power management logic 132 negates the PDOWN# signal so that the power down mode is no longer indicated. In this manner, the SCSI interrupt status register read operation in step 320 indicates that the PDOWN# signal is no longer asserted. If this occurs, the power down request is no longer indicated in step 322 and operation exits directly to step 314 and the SCSI disk drives are not spun down. In this manner, it is appreciated that all other tasks are performed before the spin down request commands are executed, and the SCSI interrupt status register is once again checked to assure that the PDOWN# signal is still asserted before any of the SCSI devices are powered down. Once the SCSI disk drives are spun down, they are only powered up if a task executed by the CPU 115 requests access to any of the SCSI disk drives. It is noted that the drive-ready timeouts for each SCSI device may need to be extended to account for drive spin up time.

Referring now to FIG. 3B, a flowchart diagram is shown illustrating operation of the SCSI device driver in response to a software interrupt or task call to the SCSI device driver. It is noted that not all calls to the SCSI device driver require access to any of the SCSI devices. Upon receiving a call by a task executing on the CPU 115 to the SCSI device driver through a software interrupt, as indicated by a step 330, the CPU 115 loads the SCSI device driver and operation proceeds to a step 332, where the parameters for the interrupt are read. Operation then proceeds to a step 333, where the task scheduler is executed to retrieve the task. Operation then proceeds to a step 334, where it is determined whether any of the SCSI disk drives are required to complete the task indicated by the interrupt. If not, operation proceeds to step a 342, where the task is performed and then the SCSI device driver exits through a step 344. If it is determined in step 334 that a SCSI disk drive is required to perform the task, operation proceeds to a step 336, where it is determined whether the requested SCSI device is spun down. This step could be performed internally, where the SCSI device driver maintains a flag for each SCSI device, or externally, where the SCSI device driver reads status buffers from the SCSI/NIC controller 120.

Operation then proceeds to a step 338 from step 336, where it is queried whether the requested SCSI disk drive is in the spun down mode. If so, operation proceeds to a step 340 from step 338, where the SCSI device driver sends a spin up command to the SCSI/NIC controller 120 to spin up the requested SCSI disk drive. Upon receipt of the spin up command, the SCSI/NIC controller 120 turns on the motors of the SCSI device. Also, the SCSI device driver sends spin up requests for each of the remaining disk drives connected to the SCSI bus 123, if any. Operation then proceeds to step 342 from step 340 to perform the task that called the interrupt. If the requested SCSI disk drive is already spun up as determined in step 338, operation proceeds directly to step 342 to perform the task. Again, once the task is performed, the device driver routine is exited through step 344.

It can now be appreciated that the SCSI disk drive power down apparatus according to the present invention provides a way to spin down the SCSI disk drives during system power down. The SCSI controller asserts an SCSI bus activity signal to the power management logic during system operation. When the computer system, or at least the disk drive subsystem, is determined to be idle, the power management logic sends a power down request to the SCSI controller indicating the initiation of the power down mode. The SCSI controller asserts an interrupt to the CPU in response to the power down signal. The CPU executes a SCSI device driver to initiate the power down of the SCSI devices. Considerable energy savings are achieved by spinning down the SCSI disk drives during the power down mode. Subsequently, any task executed by the CPU requiring access to any one of the SCSI disk drives causes the SCSI device driver to send a spin-up request to the SCSI controller for that SCSI drive. In this manner, the power down mode is relatively transparent to the user of the computer system.

The foregoing disclosure and description of the invention are illustrative and explanatory thereof, and various changes in the size, shape, materials, components, circuit elements, wiring connections and contacts, as well as in the details of the illustrated circuitry and construction and method of operation may be made without departing from the spirit of the invention.

I claim:

1. A computer system, comprising:
   a SCSI bus;
   a SCSI disk drive coupled to said SCSI bus, said SCSI disk drive operative to a plurality of commands, including a spin down command;
   a SCSI controller coupled to said SCSI bus, including:
     means for transferring received commands to said SCSI bus;
     means for monitoring activity on said SCSI bus and for providing a SCSI activity signal indicative thereof; and
     a SCSI interrupt status register receiving a power down request signal and providing an interrupt signal in response to the receipt of said power down request signal;
   a power management device coupled to said SCSI controller for monitoring a plurality of computer system activity conditions, said power management device including means for receiving said SCSI activity signal and for providing said power down request signal if said SCSI activity signal indicates that said SCSI bus has been inactive for a predetermined period of time; and a CPU coupled to said SCSI controller and said power management device, said CPU including means for receiving said SCSI interrupt signal and for executing a SCSI device driver routine in response, wherein said SCSI device driver routine causes said CPU to read said SCSI interrupt status register and determine if a power down condition is indicated by said power down signal, and to provide a spin down command to said SCSI controller to spin down said SCSI disk drive if said power down signal is present.

2. The computer system of claim 1, wherein said SCSI device driver further includes:

an internal buffer for queuing tasks to be performed by said SCSI disk drive; and wherein said SCSI device driver routine causes said CPU to queue up said spin down command into said internal buffer and perform all other tasks outstanding in said internal buffer before executing said spin down command.

3. The computer system of claim 2, wherein if other tasks are queued in said internal buffer to be performed before said spin down command, said SCSI device driver routine causes said CPU to perform those tasks first and then to read said SCSI interrupt status register again and execute said spin down command only if said power down condition is still indicated by said power down signal in said SCSI interrupt status register.

4. The computer system of claim 1, wherein said SCSI device driver routine further includes:

means for receiving task calls associated with said SCSI disk drive, wherein if a task call is received requiring said SCSI disk drive and said SCSI disk drive is spun down, said SCSI device driver routine causes said CPU to issue a spin up command to said SCSI controller.

5. The computer system of claim 1, wherein said means for receiving said SCSI activity signal and providing said power down request signal comprises:

an inactivity counter continually counting down;

means coupled to said inactivity counter for re-loading said inactivity counter with a count value representing said predetermined period of time whenever said SCSI activity signal indicates activity on said SCSI bus; and means coupled to said inactivity counter for detecting when said inactivity counter reaches zero and providing said power down request signal.

* * * * *